United States Patent [19]

Miyazawa

[11] 4,312,707

[45] Jan. 26, 1982

[54] NUCLEAR FUEL ROD

[75] Inventor: Tatsuo Miyazawa, Urayasu, Japan

[73] Assignee: Tokyo Shibaura Denki Kabushiki Kaisha, Kawasaki, Japan

[21] Appl. No.: 86,798

[22] Filed: Oct. 22, 1979

[30] Foreign Application Priority Data

Nov. 13, 1978 [JP] Japan ................................. 53/138895

[51] Int. Cl.³ ............................................... G21C 3/10
[52] U.S. Cl. ..................................... 376/450; 376/418
[58] Field of Search ................. 176/19 LD, 68, 78, 80

[56] References Cited

U.S. PATENT DOCUMENTS

| | | | |
|---|---|---|---|
| 3,663,363 | 5/1972 | Crouthamel et al. | 176/80 X |
| 3,940,313 | 2/1976 | Steven | 176/80 X |
| 3,959,069 | 5/1976 | McCormick | 176/80 X |
| 3,964,967 | 6/1976 | Nelson | 176/80 X |
| 4,106,985 | 8/1978 | Molloy et al. | 176/68 |
| 4,121,972 | 10/1978 | Steven | 176/80 X |

FOREIGN PATENT DOCUMENTS

| | | | |
|---|---|---|---|
| 2254285 | 11/1972 | Fed. Rep. of Germany | 176/80 |
| 49-5157 | 5/1974 | Japan. | |
| 53-22635 | 10/1978 | Japan. | |
| 1100723 | 1/1968 | United Kingdom | 176/80 |

OTHER PUBLICATIONS

McCormick et al., *Gas Tag Identification—Cores I Through IX*, Nuclear Technology, vol. 29, May 1976.
Strand et al., *Design and Manufacture—Assemblies*, Nuclear Technology, vol. 26, Aug. 1975.

*Primary Examiner*—Peter A. Nelson
*Attorney, Agent, or Firm*—Oblon, Fisher, Spivak, McClelland & Maier

[57] ABSTRACT

A nuclear fuel rod, which comprises:
a cladding tube filled with an inert gas or liquid metal and sealed at both ends in airtightness; and
a plurality of nuclear fuel pellets piled one atop another in the cladding tube, and wherein an adsorbent carrying a tag gas for monitoring a nuclear fuel rod failure is received in the inner space of the cladding tube defined at least above or below the nuclear fuel pellet pile.

8 Claims, 3 Drawing Figures

NUCLEAR FUEL ROD

BACKGROUND OF THE INVENTION

This invention relates to a nuclear fuel rod and more particularly to an inexpensive fuel rod, wherein a tag gas for monitoring a fuel rod failure is sealed in the inner spaces of a cladding tube which surround the nuclear fuel pellets placed therein.

A nuclear fuel rod generally comprises, as shown in FIG. 1, a cladding tube 1 made of, for example, stainless steel or Zircaloy, a plurality of nuclear fuel pellets 2 placed one atop another in the cladding tube and a pair of upper and lower plugs 3, 4. A plenum spring 6 for restricting the displacement of the nuclear fuel pellets 2 is set in a plenum section 5 which is formed above a pile of the nuclear fuel pellets 2, or, if occasion demands, both above and below said pile. An inert gas such as helium (He) or liquid metal such as sodium is sealed as heating medium in the plenum section 5 and a pellet gap lying between the cladding tube and fuel pellet pile 2.

A large number of fuel rods constructed as described above are specially arranged to form a fuel assembly. Further, a large number of said fuel assemblies constitute the core of a nuclear reactor. The cladding tube of the fuel rod is primarily intended (1) to suppress a chemical reaction between the fuel pellet 2 and a coolant or moderator and (2) to prevent highly radioactive fission products from being released into the coolant or moderator. Should, therefore, the cladding tube be locally melted or cracked, then there will be the possibility that the coolant or moderator will be contaminated by radioactivity, presenting difficulties in the operation and control of a nuclear reactor. If, therefore, the cladding tube is damaged, it will be necessary to detect the leakage of radioactive material in the early stage and take proper countermeasures.

Hitherto, a defective fuel rod has been distinguished from among the numerous fuel rods constituting the core by means of the gas tagging method. This method comprises the steps of sealing different tag gases in the cladding tubes of the respective fuel rods; and, if it is found that the cladding tube of any of said fuel rods is damaged, analyzing a sample of a gas leaking, for example, into a coolant; and distinguishing the damaged fuel rod from the analyzed gas composition. The tag gas used for this object should be inert to a reactor material, nuclear fuel material, coolant and moderator. A tag gas used to date is formed of a gas mixture consisting of isotopes of noble gases such as Neon (Ne), Xenon (Xe) or Krypton (Kr) blended in various ratios.

A known process of sealing a tag gas in the cladding tube of a fuel rod includes the contactless mechanical type which comprises the steps of placing a small metal capsule containing a tag gas in the cladding tube and breaking up the metal capsule by electromagnetically moving a penetrator provided with a sharp end to release the tag gas ("Nuclear Technology", Vol. 26, pp. 472-479, 1975) and another type which comprises the steps of sealing a tag gas in a vessel made of an alloy having a lower melting point than the operating temperature of a nuclear reactor, inserting said vessel into a capsule, placing said capsule in the cladding tube of a fuel rod, and melting away the alloy by the high operating temperature of the nuclear reactor to release the tag gas (the Japanese patent publication No. 53-22635, 1978).

With the tag gas method, different forms of tag gas are generally used for a large number of fuel assemblies constituting a nuclear reactor. With a nuclear reactor containing 200 to 300 fuel assemblies, it is necessary to apply 200 to 300 different forms of tag gas. Since, one fuel assembly is formed of 50 to 200 fuel rods, and 50 to 200 capsules have to be used for one form of tag gas representing one fuel assembly, a total number of capsules used amounts to scores of thousands, thus consuming a tremendous amount of money for the manufacture of such numerous capsules. This is one of the reasons why the gas tagging method has now ceased to be used with a nuclear power reactor.

SUMMARY OF THE INVENTION

It is accordingly the object of this invention to provide a nuclear fuel rod, wherein a tag gas is sealed in the cladding rod to monitor the failure of said fuel rod, and which can be manufactured at a lower cost than the prior art fuel rod containing a sealed tag gas.

To attain the above-mentioned object, this invention provides a nuclear fuel rod, which comprises a cladding tube filled with an inert gas or liquid metal and sealed at both ends in airtightness, and a plurality of nuclear fuel pellets piled one atop another in the cladding tube, and wherein an adsorbent carrying a tag gas for monitoring the failure of a nuclear fuel rod is received in the inner space of the cladding tube formed at least above or below the pile of nuclear fuel pellets.

DETAILED DESCRIPTION OF THE PREFERRED EMBODIMENT

When a nuclear fuel rod embodying this invention is constructed, an adsorbent carrying a tag gas is sealed in the cladding tube of said nuclear fuel rod. Where a nuclear fuel rod constructed as described above is set in a nuclear reactor, a tag gas is released from the adsorbent when an operating nuclear reactor produces a progressively increasing output and the fuel rod temperature rises accordingly. The released tag gas is diffused through the inner space of the cladding tube, thus providing a nuclear fuel rod containing a freed tag gas.

The adsorbent used in this invention may be of the type which is applied in the customary adsorption process. Namely, the adsorbent includes, for example, active carbon, Molecular Sieves (trademark), silica gel, and alumina. Particularly preferred is active carbon.

The adsorbent is separated from the fuel pellet pile by being held in a perforated container or a container open at the top which is made of stainless steel, copper or alumina.

Figure 2:
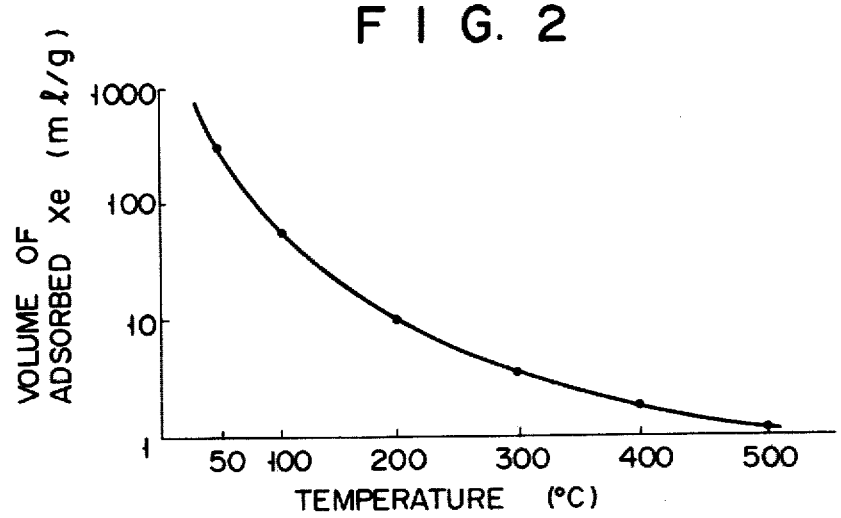
FIG. 2 graphically indicates the relationship between the amount of xenon (Xe) carried by an adsorbent of active carbon used with this invention and the absorbing temperature.

The tag gas is formed of a mixture of isotopes of noble gases such as neon, xenon and krypton blended in various ratios. With a fuel rod used with, for example, a liquid metal-cooled fast breeder, it is generally necessary to provide 10 ml (N.T.P.) of a tag gas for detection of a fuel rod failure. Where a tag gas is formed of xenon alone, a 1 g active carbon adsorbs about 500 ml (N.T.P.)/g of xenon at a temperature of 50° C. (FIG. 2). Accordingly, 20 mg of active carbon is required to adsorb 10 ml (N.T.P.) of xenon. As seen from FIG. 2, an active carbon heated to a higher temperature than 300° C. releases more than 99% of the xenon which was initially adsorbed at a temperature of 50° C. Part of the released xenon gas is sometimes again adsorbed to the adsorbent when a nuclear reactor is put out of operation.

When, however, the nuclear reactor is restarted, the xenon gas is released once more. The aforesaid temperature of 300° C. of the active carbon is reached when a nuclear reactor generates 10% output.

A tag gas can be adsorbed to an adsorbent in a required amount at normal temperature, for example, 0° to 50° C. However, a tag gas may be adsorbed at a very low temperature as $-180°$ C. An adsorbent can adsorb a sufficient amount of a tag gas when placed for 10 minutes in a tag gas flowing at a flow rate of 10 cc/min.

Figure 1:
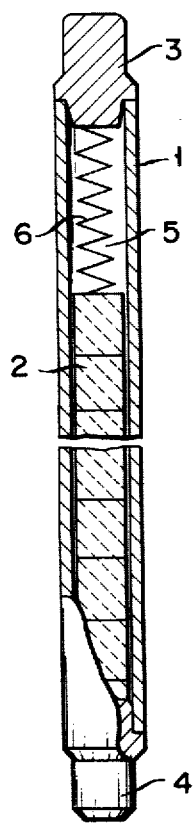
FIG. 1 is a sectional view of a prior art nuclear fuel rod.
Figure 3:
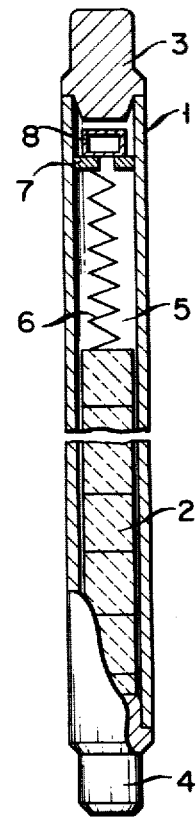
FIG. 3 is a sectional view of a nuclear fuel rod embodying this invention.

FIG. 3 is a sectional view of a nuclear fuel rod embodying this invention. The parts of FIG. 3 the same as those of FIG. 1 are denoted by the same numerals. With the fuel rod of FIG. 3, a disc 7 drilled at the center is set above the plenum section 5 to support a perforated adsorbent container 8. This adsorbent container 8 is filled with an adsorbent such as active carbon adsorbing a tag gas, and is placed in a chamber defined between the support disc 7 and plug 3. A plenum spring 6 is provided between the support disc 7 and the top of the nuclear fuel pellet pile 2.

With the nuclear fuel rod of FIG. 3, the adsorbent container 8 was disposed between the plenum spring 6 and plug 3. However, this invention is not limited to this arrangement. But it is possible to set the adsorbent container 8 between the plenum spring 6 and the top of the nuclear fuel pellet pile 2. In this case, the adsorbent container 8 lying below the plenum section 5 is advised to have an opening at the top. Where active carbon is used as a tag gas adsorbent, it is preferred to form the adsorbent container 8 of copper in order to prevent the carborization of the cladding tube 1.

With the nuclear fuel rod of this invention, a tag gas is sealed therein simply by placing a container filled with a tag gas-carrying adsorbent in the inner space of the nuclear fuel rod. Therefore, the tag gas-sealing process of this invention has its cost reduced to about one thousandth part of that which has hitherto been required to mechanically break a tag gas-sealed capsule, and also to about one five hundredth part of that which has formerly been required to melt away a tag gas-sealed capsule. Considering that one nuclear reactor contains scores of thousands of nuclear fuel rods, this invention offers prominent advantage is reducing the manufacturing cost of a nuclear reactor. In other words, the invention provides an very advantageous nuclear fuel rod, wherein a tag gas can be sealed in the cladding tube and released therefrom at a far lower cost than has been possible in the past.

I claim:
1. A nuclear fuel rod, which comprises:
a cladding tube filled with an insert gas or liquid metal and sealed at both ends in airtightness; and
a plurality of nuclear fuel pellets piled one atop another in the cladding tube, wherein an adsorbent carrying a tag gas for monitoring a nuclear fuel rod failure is received in the inner space of the cladding tube defined at least above or below the nuclear fuel pellet pile whereby said gas or liquid metal is released from said adsorbent when the temperature thereof increases.

2. The nuclear fuel rod according to claim 1, wherein the adsorbent is one selected from the group consisting of active carbon, Molecular Sieves, silica gel and active alumina.

3. The nuclear fuel rod according to claim 1, wherein the adsorbent is active carbon.

4. The nuclear fuel rod according to claim 1, wherein the adsorbent is received in a container.

5. The nuclear fuel rod according to claim 3, wherein the container is formed of one selected from the group consisting of stainless steel, copper and alumina and perforated at the top.

6. The nuclear fuel rod according to claim 4, wherein a disc for supporting the adsorbent container which is perforated at the center is set in the inner space of the cladding tube defined above the nuclear fuel pellet pile; and the adsorbent container is placed in a chamber provided above the support disc.

7. The nuclear fuel rod according to claim 1, wherein the tag gas is at least one of noble gas selected from the group consisting of neon, xenon, and krypton.

8. The nuclear fuel rod according to claim 3, wherein the container is formed of one selected from the group consisting of stainless steel, copper and alumina and open at the top.

* * * * *